United States Patent
Muller et al.

(10) Patent No.: US 10,877,778 B2
(45) Date of Patent: Dec. 29, 2020

(54) SEQUENCE DETECTION AND AUTOMATION FOR COMPLEX PORTAL ENVIRONMENTS

(75) Inventors: Michael Muller, Medford, MA (US); Corinne M. Ryan, Westford, MA (US); Michael C. Wu, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1255 days.

(21) Appl. No.: 11/949,969

(22) Filed: Dec. 4, 2007

(65) Prior Publication Data

US 2009/0144625 A1 Jun. 4, 2009

(51) Int. Cl.
*G06F 3/0481* (2013.01)
*G06F 3/0489* (2013.01)
*G06F 9/451* (2018.01)
*G06F 11/34* (2006.01)
*G06F 3/01* (2006.01)

(52) U.S. Cl.
CPC .............. *G06F 9/451* (2018.02); *G06F 3/01* (2013.01); *G06F 11/3466* (2013.01)

(58) Field of Classification Search
CPC .. G06F 3/0481; G06F 3/04842; G06F 3/0489; G06F 9/4446; G06F 9/451; G06F 3/01; G06F 11/3466
USPC ........................................ 715/827, 772, 817
See application file for complete search history.

(56) References Cited

U.S. PATENT DOCUMENTS

| | | | |
|---|---|---|---|
| 5,530,869 A * | 6/1996 | Salle | 717/113 |
| 6,104,317 A * | 8/2000 | Panagrossi | G06F 3/04883 178/18.01 |
| 6,231,812 B1 * | 5/2001 | Rothberg | C12N 15/10 422/68.1 |
| 6,594,766 B2 | 7/2003 | Rangan et al. | |
| 7,453,439 B1 * | 11/2008 | Kushler | G06F 3/0237 345/168 |
| 7,519,916 B1 * | 4/2009 | Hartwell et al. | 715/771 |
| 7,672,924 B1 * | 3/2010 | Scheurich | G06F 17/30392 707/999.002 |
| 7,890,987 B2 * | 2/2011 | Freimann | H04N 5/4401 725/100 |
| 8,375,295 B2 * | 2/2013 | Zalewski | G06F 1/1626 345/173 |
| 2002/0156905 A1 | 10/2002 | Weissman | |

(Continued)

*Primary Examiner* — Li P Sun
*Assistant Examiner* — Le V Nguyen
(74) *Attorney, Agent, or Firm* — Caleb D. Wilkes

(57) ABSTRACT

Embodiments of the present invention address deficiencies of the art in respect to user interface interaction automation and provide a method, system and computer program product for user interface interaction sequence detection and recording for user interface interaction automation. In an embodiment of the invention, a method for user interface interaction sequence detection and recording for user interface interaction automation can be provided. The method can include comparing a contemporary sequence of user interface actions in a user interface to a pre-stored sequence, and prompting for an expected user interface action if the contemporary sequence matches the pre-stored sequence. The method also can include prompting to store the contemporary sequence as a pre-stored sequence, and storing the contemporary sequence as a pre-stored sequence if directed in response to the prompting.

8 Claims, 1 Drawing Sheet

(56) References Cited

U.S. PATENT DOCUMENTS

| | | | |
|---|---|---|---|
| 2003/0233586 A1 | 12/2003 | Urakami et al. | |
| 2004/0176958 A1* | 9/2004 | Salmenkaita | H04M 1/72561 704/275 |
| 2004/0201607 A1* | 10/2004 | Mulvey | G06F 3/0237 715/708 |
| 2004/0250118 A1 | 12/2004 | Andreev et al. | |
| 2004/0263475 A1* | 12/2004 | Wecker et al. | 345/157 |
| 2005/0060448 A1* | 3/2005 | Gutowitz | G06F 3/018 710/72 |
| 2005/0154591 A1* | 7/2005 | Lecoeuche | H04M 1/72561 704/270.1 |
| 2005/0154999 A1* | 7/2005 | Wugoski | 715/827 |
| 2005/0175015 A1 | 8/2005 | Ramaswamy et al. | |
| 2005/0283358 A1* | 12/2005 | Stephanick | G06F 3/0233 704/7 |
| 2006/0020566 A1* | 1/2006 | Wu | G06Q 10/10 706/50 |
| 2006/0026572 A1* | 2/2006 | Srivastava | 717/136 |
| 2006/0080730 A1 | 4/2006 | Cahill et al. | |
| 2006/0218061 A1* | 9/2006 | Mouline | 705/35 |
| 2006/0218629 A1 | 9/2006 | Pearson et al. | |
| 2006/0218630 A1 | 9/2006 | Pearson et al. | |
| 2007/0136682 A1* | 6/2007 | Stienhans | G06F 9/4443 715/789 |
| 2007/0259717 A1* | 11/2007 | Mattice | A63F 3/00157 463/36 |
| 2007/0300174 A1* | 12/2007 | Macbeth et al. | 715/772 |
| 2008/0055269 A1* | 3/2008 | Lemay | G06F 3/0482 345/173 |
| 2008/0295003 A1* | 11/2008 | Behl | 715/760 |
| 2009/0037378 A1* | 2/2009 | Moor et al. | 707/3 |
| 2009/0327184 A1* | 12/2009 | Nishizaki | G06F 3/0482 706/46 |

\* cited by examiner

SEQUENCE DETECTION AND AUTOMATION FOR COMPLEX PORTAL ENVIRONMENTS

BACKGROUND OF THE INVENTION

Field of the Invention

The present invention relates to the field of application macros and scripting and more particularly to user interface interaction automation.

Description of the Related Art

Macro instructions refer to the organization of a sequence of instructions into a single instruction. Macro instructions came into vogue decades ago as a technical tool for automating tedious, repetitive program instructions into a single, composite instruction. Macros and later, batch scripts later were utilized by end users to automate keyboard strokes and other user interface operations that had been repeated often. By creating macros and scripts, end users not only could automate tedious, repetitive tasks, but also end users could avoid mistakes in data entry by relying on a pre-specified, tested sequence of keyboard strokes.

With the advent of the graphical user interface, the use of the macro fell out of widespread use. Yet, the change in the nature of the user interface did not obviate the utility of bundling a set of user interface actions into a single composite command. Most recently, functional testing tools utilize user interface interaction macros to memorize a sequence of user interface interactions in order to simulate user interactions with a user interface of an application under test. However, the memorized sequence usually is stored as a separate programmatic script processed by the functional testing tool. In this way, testers can replace the script to simulate different user interaction scenarios.

Beyond functional testing, user interface interaction automation has found limited applicability. Yet, the utility of automating user interface interactions has not changed in decades. In fact, the ever increasing complexity of computing environments provides a substantial justification for user interface interaction automation. For instance, within a complex portal environment, end users often engage in many different user interface actions in sequence to achieve an end goal in the portal environment. Often, these steps involve routinized sequences of mouse and keyboard actions—navigate to one portlet in the portal environment, obtain focus on a specified data field, type text in the field, click a button, navigate to another portlet, click another button select an option from a pull-down menu, etc.

Complex sequences like those described above can be labor-intensive and error-prone and can be vulnerable to loss of context during an interruption of the sequence of actions. In this regard, end users often can be interrupted when interacting with a complex portal environment for any number of reasons including telephone calls, impromptu office meetings and the like. Thus, a need has arising to identify common sequences and bundle those common sequences to remind the user of a position in a known sequence of user interface interactions following in interruption in the known sequence.

BRIEF SUMMARY OF THE INVENTION

Embodiments of the present invention address deficiencies of the art in respect to user interface interaction automation and provide a novel and non-obvious method, system and computer program product for user interface interaction sequence detection and recording for user interface interaction automation. In an embodiment of the invention, a method for user interface interaction sequence detection and recording for user interface interaction automation can be provided. The method can include comparing a contemporary sequence of user interface actions in a user interface to a pre-stored sequence, and prompting for an expected user interface action if the contemporary sequence matches the pre-stored sequence. The method also can include prompting to store the contemporary sequence as a pre-stored sequence, and storing the contemporary sequence as a pre-stored sequence if directed in response to the prompting.

In one aspect of the embodiment, prompting for an expected user interface action if the contemporary sequence matches the pre-stored sequence can include prompting for an expected user interface action if the contemporary sequence exactly matches the pre-stored sequence. Alternatively, in another aspect of the embodiment, prompting for an expected user interface action if the contemporary sequence matches the pre-stored sequence can include prompting for an expected user interface action if the contemporary sequence matches a threshold number of user interface actions with user interface actions in the pre-stored sequence.

In even yet another aspect of the embodiment, prompting for an expected user interface action if the contemporary sequence matches the pre-stored sequence can include detecting hesitancy in continuing the contemporary sequence of user interface actions, and prompting for an expected user interface action if the contemporary sequence matches the pre-stored sequence upon detecting the hesitancy. For instance, detecting hesitancy in continuing the contemporary sequence of user interface actions can include detecting a lapse of time between user interface interactions beyond a threshold value. Finally, in even yet further another aspect of the embodiment, the method can include invoking the pre-stored sequence as a macro from a menu in the user interface.

In another embodiment of the invention, a user interface data processing system can be provided. The system can include a user interface such as a portal environment, a table of memorized sequences, and a detector-automator. The detector-automator can include program code enabled to compare a contemporary sequence of user interface actions in the user interface to a pre-stored sequence in the table of memorized sequences, and to prompt within the user interface for an expected user interface action if the contemporary sequence matches the pre-stored sequence. Further, the program code also can be enabled to prompt to store the contemporary sequence as a pre-stored sequence and to store the contemporary sequence as a pre-stored sequence if directed in response to the prompting.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for user interface interaction sequence detection and recording for user interface interaction automation. In accordance with an embodiment of the present invention, a repeated sequence of user interface interactions can be identified within a computing environment. Once identified, the sequence can be selectively recorded. Thereafter, the sequence can be invoked from within the computing environment. Alternatively, a delay in completing the sequence can be detected and an indication of a place within the sequence to resume the sequence can be provided within the user interface.

Figure 1:
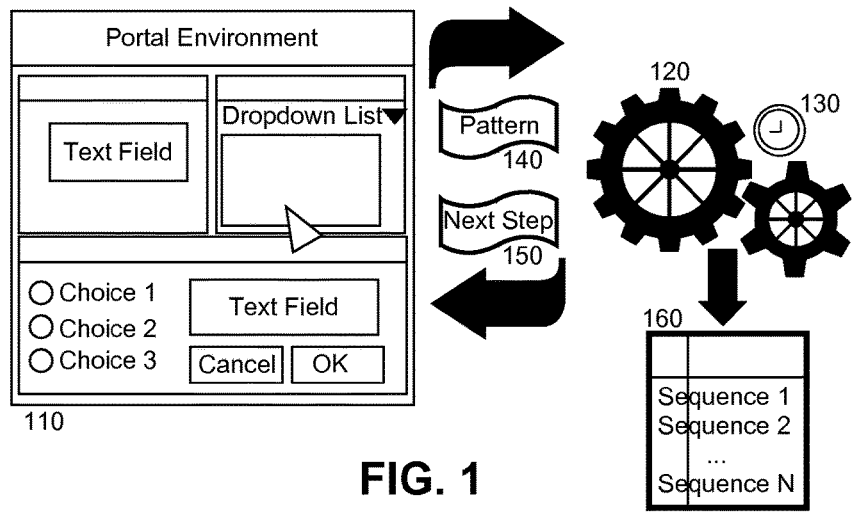
FIG. 1 is a pictorial illustration of a process for user interface interaction sequence detection and recording for user interface interaction automation.

In illustration, FIG. 1 is a pictorial illustration of a process for user interface interaction sequence detection and recording for user interface interaction automation. As shown in FIG. 1, a portal environment 110 can be provided to include multiple different portlets, each providing different user interface controls such as text entry fields, buttons, drop down lists and the like. A user interface interaction sequence detector-automator 120 can process user interactions with the portal environment 110 in order to detect a pattern 140 of user interactions within the portal environment 110.

In this regard, the detector-automator 120 can identify a new sequence of user interface interactions comparable to a previously recorded sequence of user interface interactions in the portal environment sufficient to indicate a repeated use of the sequence. In response to detecting such a pattern 140, the detector-automater 120 can prompt the end user that a familiar sequence of user interface interactions had been detected and provide an option for the end user to memorize the sequence in a table of memorized sequences 160 and render the sequence accessible as a short cut, for example from a menu in the portal environment 110.

Once a sequence has been memorized and placed in the table of memorized sequences 160, the detector-automator 120 can detect a pattern 140 which matches a portion of a stored sequence within the table of memorized sequences 160. Once the detector-automator 120 matches the pattern 140 to an entry in the table of memorized sequences 160, a timer 130 coupled to the detector-automator 120 can indicate to detector-automator 120 when an end user has become distracted or otherwise hesitates in proceeding through the sequence. In response, the detector-automator 120 can consult the matched entry in the table of memorized sequences 160 to identify a next user interface action 150 in the sequence. Consequently, the end user can be prompted to perform the indicated next user interface action 150.

Figure 2:
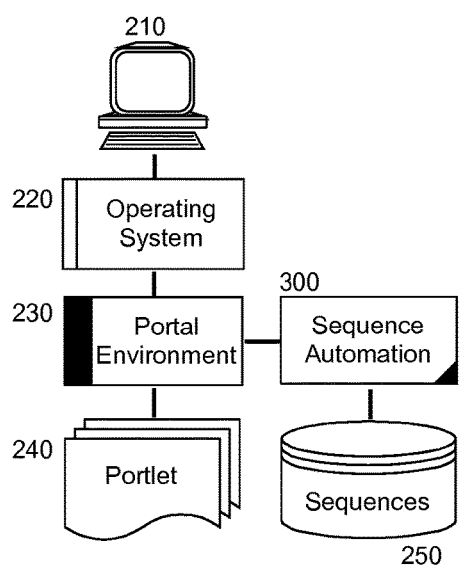
FIG. 2 is a schematic illustration of a portal computing environment configured for user interface interaction sequence detection and recording for user interface interaction automation; and, FIG. 3 is a flow chart illustrating a process for user interface interaction sequence detection and recording for user interface interaction automation.

The process shown in FIG. 1 can be implemented in a portal computing environment. In illustration, FIG. 2 schematically depicts a portal computing environment configured for user interface interaction sequence detection and recording for user interface interaction automation. The system can include a host computing platform 210 hosting the execution of an operating system 220. The operating system 220 in turn can be configured to support the arrangement of a portal environment 230 from which multiple different portlets 240 can be accessed by an end user through different user interface interactions. In one aspect of the embodiment, the portal environment 230 can be provided by a remote server over a computer communications network and rendered in a content browser (not shown) executing in the operating system 220.

Notably, sequence automation logic 300 can be coupled to the portal environment 230 and also to a data store of sequences 250. The sequence automation logic 300 can include program code enabled to track user interface interactions in the portal environment 230 and to detect similar or identical patterns of user interface interactions. In particular, the program code can be enabled to determine a discrete sequence of user interface interactions in the portal environment 230 and to compare the sequence with sequences in the data store of sequences 250.

To the extent that the discrete sequence matches or is similar to within a user-specified threshold of a sequence disposed within the data store of sequences 250, the program code of the sequence automation logic 300 can be enabled to prompt the user with information pertaining to a next step in the sequence—particularly where it is determined that the end user hesitates in completing the expected sequence. In the alternative, to the extent that the discrete sequence does not match or is not similar to a sequence disposed within the data store of sequences 250, upon completion of the sequence the program code of the sequence automation logic 300 can be enabled to prompt the end user to store the completed sequence in the data store of sequences 250 to be recalled by the end user or to be used to provide guidance to a hesitating end user.

Figure 3:
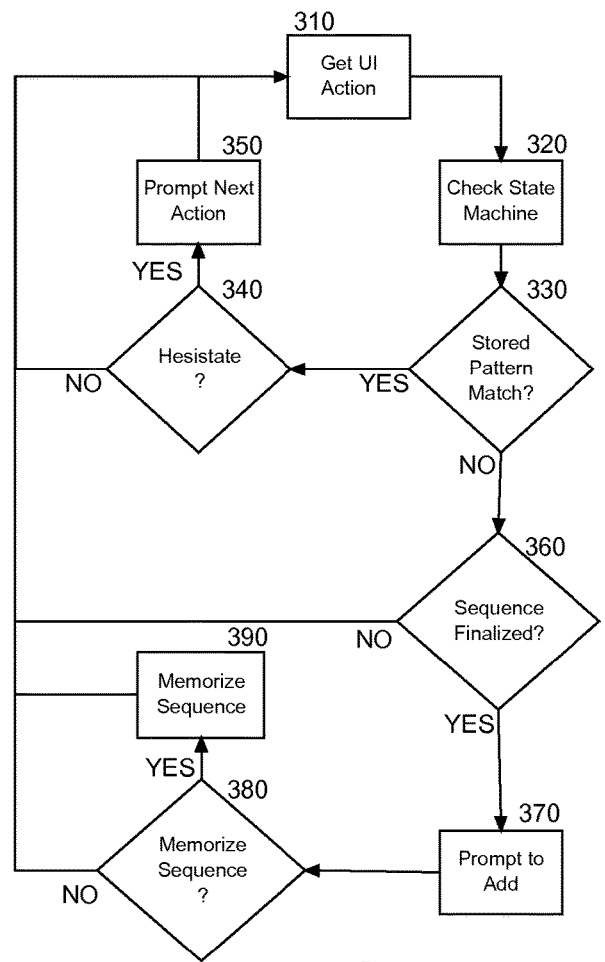

In yet further illustration, FIG. 3 is a flow chart illustrating a process for user interface interaction sequence detection and recording for user interface interaction automation. Beginning in block 310 a user interface action can be detected in a user interface. In block 320, the user interface action can be added to a contemporary sequence of user interface actions as a most recent user interface action. In decision block 330, it can be determined whether the contemporary sequence matches a stored sequence or, optionally, if the contemporary sequence shares enough user interface actions within a threshold percentage of matching user interface actions to declare a match. If so, the process can continue through decision block 340. Otherwise, the process can continue through decision block 360.

In decision block 360, it can be determined whether the sequence has finalized. In this regard, the end user can manually specify when a sequence of user interface actions have completed, or the completion of a sequence can be inferred from the behavior of the end user, such as a threshold passage of time between user interface actions. If it is determined that the sequence has finalized, in block 370 the user can be prompted to add a macro for the sequence which can be included as a shortcut or menu command. In decision block 380, if the end user accepts the proposal, the sequence can be added to a table of memorized sequences and inserted into a menu of sequences in block 390. Thereafter, the next user interface action can be received in block 310 and the process can repeat.

By comparison, in decision block 330, if a match is found for the sequence, in decision block 340, it can be determined whether or not the end user has hesitated in the expected sequence of user interface actions. In this regard, if a threshold period of time has elapsed between user interface interactions, the end user can be viewed as hesitating. If so, in block 350 the end user can be prompted with a next expected user interface action based upon the expected sequence. Alternatively, a complete or partial listing of the expected user interface actions in the expected sequence can be provided to the end user. In either case, the end user will be reminded of the sequence though the end user may have become distracted or otherwise disengaged from the sequence.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for user interface interaction sequence detection and recording for user interaction automation, the method comprising:

determining a first plurality of user interface interactions have been received over a duration of time;

submitting to a state machine a first contemporary sequence of different, separate user interface mouse clicks in different user interface controls of a user interface, wherein the first contemporary sequence comprises the received first plurality of user interface interactions, and the first contemporary sequence favorably matches a pre-stored sequence of different, separate user interface mouse clicksin different user interface controls;

detecting a lapse of a threshold duration of time during which no user interface interactions are received indicating a first user hesitancy in completing an expected sequence comprising the first contemporary sequence;

in response to detecting the first user hesitancy, identifying a partial listing of user interface actions in the pre-stored sequence and displaying a prompt in the user interface with the partial listing;

determining a second plurality of user interface interactions have been received over a duration of time;

submitting to the state machine a second contemporary sequence of different, separate user interface mouse clicks in different user interface controls of the user interface, wherein the second contemporary sequence comprises the received second plurality of user interface interactions, and the second contemporary sequence does not favorably match the pre-stored sequence of different, separate user interface mouse clicksin different user interface controls;

determining a completion of entry of the second contemporary sequence asa result of detecting a second user hesitancy in continuing the second contemporary sequence of user interface actions reflected by a lapse of a threshold value of time since a last user interface action in the user interface: and in response to determining the completion of the entry of the second contemporary sequence, displaying a prompt in the user interface to add the completed second contemporary sequence to the state machine.

2. The method of claim 1, further comprising:

on the condition that the first contemporary sequence favorably matchesthe pre-stored sequence of user interface interactions, identifying in the state machine a next action and prompting the end user to perform the next action in the user interface.

3. The method of claim 1, wherein the first contemporary sequence isdetermined to have favorably matched the pre-stored sequence when the first contemporary sequence exactly matches the pre-stored sequence.

4. The method of claim 1, further comprising invoking the pre-stored sequence as a macro from a menu in the user interface.

5. A user interface data processing system comprising:

a processor;

a user interface;

a table of memorized sequences of user interface interactions; and a detector-automator comprising program code enabled to:

determine a first plurality of user interface interactions have been received over a duration of time;

submit to a state machine a first contemporary sequence of different, separate user interface mouse clicks in different user interface controls of a user interface, wherein the first contemporary sequence comprises the received first plurality of user interface interactions, and the first contemporary sequence favorably matches a pre-stored sequence of different, separate user interface mouse clicks in different user interface controls;

detect a lapse of a threshold duration of time during which no user interface interactions are received indicating a first user hesitancy in completing an expected sequence comprising the first contemporary sequence;

in response to detecting the first user hesitancy, identify a partial listing of user interface actions in the pre-stored sequence and displaying a prompt in the user interface with the partial listing;

determine a second plurality of user interface interactions have been received over a duration of time;

submit to the state machine a second contemporary sequence of different, separate user interface mouse clicks in different user interface controls of the user interface, wherein the second contemporary sequence comprisesthe received second plurality of user interface interactions, and the second contemporary sequence does not favorably match the pre-stored sequence of different, separate user interface mouse clicksin different user interface controls;

determine a completion of entry of the second contemporary sequence as a result of detecting a second user hesitancy in continuing the second contemporary sequence of user interface actions reflected by a lapse of a threshold value of time since a last user interface action in the user interface; and in response to determining the completion of the entry of the second contemporary sequence, display a prompt in the user interface to add the completed second contemporary sequence to the state machine.

6. A computer program product comprising a non-transitory computer usable storage memory device storing therein computer usable program code for user interface interaction sequence detection and recording for user interface interaction automation, the computer program product comprising:

computer usable program code for determining a first plurality of user interface interactions have been received over a duration of time;

computer usable program code for submitting to a state machine a first contemporary sequence of different, separate user interface mouse clicks in different user interface controls of a user interface, wherein the first contemporary sequence comprises the received first plurality of user interface interactions, and the first contemporary sequence favorably matches a pre-stored sequence of different, separate user interface mouse clicks in different user interface controls;

computer usable program code for detecting a lapse of a threshold duration of time during which no user interface interactions are received indicating a first user hesitancy in completing an expected sequence comprising the first contemporary sequence;

computer usable program code for, in response to detecting the first user hesitancy, identifying a partial listing of user interface actions in the pre-stored sequence and displaying a prompt in the user interface with the partial listing;

computer usable program code for determining a second plurality of user interface interactions have been received over a duration of time;

computer usable program code for submitting to the state machine a second contemporary sequence of different, separate user interface mouse clicks in different user interface controls of the user interface, wherein the second contemporary sequence comprises the received second plurality of user interface interactions, and the second contemporary sequence does not favorably match the pre-stored sequence of different, separate user interface mouse clicks in different user interface controls;

computer usable program code for determining a completion of entry of the second contemporary sequence as a result of detecting a second user hesitancy in continuing the second contemporary sequence of user interface actions reflected by a lapse of a threshold value of time since a last user interface action in the user interface; and computer usable program code for, in response to determining the completion of the entry of the second contemporary sequence, displaying a prompt in the user interface to add the completed second contemporary sequence to the state machine.

7. The computer program product of claim 6, further comprising computer usable program code for invoking the pre-stored sequence as a macro from a menu in the user interface.

8. The computer program product of claim 6, wherein the user interface is a portal environment.

\* \* \* \* \*